(12) United States Patent
Hane

(10) Patent No.: US 12,440,977 B2
(45) Date of Patent: Oct. 14, 2025

(54) CONTROL DEVICE, ROBOT SYSTEM, AND CONTROL METHOD FOR CAUSING ROBOT TO EXECUTE WORK ON WORKPIECE

(71) Applicant: Fanuc Corporation, Yamanashi (JP)

(72) Inventor: Mikito Hane, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 277 days.

(21) Appl. No.: 17/927,062

(22) PCT Filed: May 24, 2021

(86) PCT No.: PCT/JP2021/019650
§ 371 (c)(1),
(2) Date: Nov. 22, 2022

(87) PCT Pub. No.: WO2021/241512
PCT Pub. Date: Dec. 2, 2021

(65) Prior Publication Data
US 2023/0202039 A1 Jun. 29, 2023

(30) Foreign Application Priority Data
May 28, 2020 (JP) .................................. 2020-093562

(51) Int. Cl.
*B25J 9/16* (2006.01)
*B25J 9/00* (2006.01)
(Continued)

(52) U.S. Cl.
CPC ........... *B25J 9/1664* (2013.01); *B25J 9/0093* (2013.01); *B25J 9/1653* (2013.01); *B25J 5/02* (2013.01);
(Continued)

(58) Field of Classification Search
CPC ...... B25J 9/1664; B25J 9/1653; B25J 9/1658; B25J 11/005; B25J 5/02; B25J 9/0093;
(Continued)

(56) References Cited

U.S. PATENT DOCUMENTS 4,086,522 A * 4/1978 Engelberger ........... G05B 19/42
29/430
5,465,037 A * 11/1995 Huissoon ............... B25J 9/1684
901/42
(Continued)

FOREIGN PATENT DOCUMENTS

DE 27 40 507 A1 3/1978
JP 0778021 A 3/1995
(Continued)

OTHER PUBLICATIONS

International Search Report and Written Opinion for International Application No. PCT/JP2021/019650, dated Jul. 6, 2021, 5 pages.

*Primary Examiner* — Abby Lin
*Assistant Examiner* — Karston G. Evans
(74) *Attorney, Agent, or Firm* — Buchanan Ingersoll & Rooney PC

(57) ABSTRACT

When performing work on a workpiece with a tool of a robot while the robot and the workpiece are moved relative to each other by an additional axis mechanism, the tool is to be pressed against the workpiece from an appropriate direction. A control device configured to perform the work includes a processor that acquires an additional axis movement amount, generates a movement command for a robot based on operation plan data of the robot and the additional axis movement amount, based on the operation plan data or the additional axis movement amount, acquires a vector in a direction along a work target portion of a workpiece, and determines a pressing direction in which the robot is to press (Continued)

the tool against the workpiece during work by multiplying the acquired vector by a known rotation vector.

8 Claims, 10 Drawing Sheets

(51) Int. Cl.
  *B25J 5/02* (2006.01)
  *B25J 11/00* (2006.01)
  *G05B 19/418* (2006.01)
(52) U.S. Cl.
  CPC ......... *B25J 11/005* (2013.01); *G05B 19/4182* (2013.01); *G05B 2219/39102* (2013.01)
(58) Field of Classification Search
  CPC ............... B25J 9/1633; G05B 19/4182; G05B 2219/39102; G05B 2219/39198; B23Q 15/0075
  See application file for complete search history.

(56) References Cited

U.S. PATENT DOCUMENTS

| 9,724,801 | B2 | 8/2017 | Gu | |
| 9,782,896 | B2 | 10/2017 | Terada | |
| 2009/0214312 | A1* | 8/2009 | Geisel | B25J 9/1664 |
| | | | | 700/95 |
| 2010/0234994 | A1* | 9/2010 | Shi | B25J 9/1697 |
| | | | | 901/41 |
| 2014/0088746 | A1* | 3/2014 | Maloney | G05B 19/4099 |
| | | | | 700/97 |
| 2018/0043527 | A1* | 2/2018 | Koga | G05B 19/19 |
| 2018/0164788 | A1* | 6/2018 | Shimamura | B25J 9/0093 |
| 2019/0275678 | A1* | 9/2019 | Takeuchi | B25J 9/163 |
| 2020/0368859 | A1* | 11/2020 | Zhang | B25J 9/1684 |

FOREIGN PATENT DOCUMENTS

| JP | 2012020348 A | 2/2012 |
| JP | 2015009324 A | 1/2015 |
| WO | 2018088199 A1 | 5/2018 |

* cited by examiner

CONTROL DEVICE, ROBOT SYSTEM, AND CONTROL METHOD FOR CAUSING ROBOT TO EXECUTE WORK ON WORKPIECE

CROSS REFERENCE TO RELATED APPLICATIONS

This is the U.S. National Phase application of PCT/JP2021/019650, filed May 24, 2021 which claims priority to Japanese Patent Application No. 2020-093562, filed May 28, 2020, the disclosures of these applications being incorporated herein by reference in their entireties for all purposes.

FIELD OF THE INVENTION

The present invention relates to a control device, a robot system, and a control method for causing a robot to perform work on a workpiece.

BACKGROUND OF THE INVENTION

A robot system is known (e.g., Patent Document 1) that presses a tool of a robot against a workpiece to perform work (deburring, etc.) on the workpiece.

Patent Literature

Patent Document 1: JP 2015-009324 A

SUMMARY OF THE INVENTION

When work is to be performed on a large workpiece, there is a demand to perform work on the workpiece with a tool of a robot while moving the robot and the workpiece relative to each other by an additional axis mechanism. In such a case, the tool is desirably pressed against the workpiece from an appropriate direction.

In one aspect of the present disclosure, a control device configured to perform work on a workpiece by pressing a tool of a robot against the workpiece while an additional axis mechanism moves the robot and the workpiece relative to each other, the control device including an additional axis movement amount acquisition section configured to acquire an additional axis movement amount by which the additional axis mechanism moves the robot or the workpiece, a command generation section configured to generate a movement command for causing the robot to move the tool along a work target portion on the workpiece so as to follow movement of the robot or the workpiece by the additional axis mechanism, based on the additional axis movement amount and operation plan data for causing the robot to perform an operation to move the tool along the work target portion, a vector acquisition section configured to, based on the operation plan data or the additional axis movement amount, acquire a vector in a direction along the work target portion, which inclines in response to the additional axis movement amount with respect to a movement vector of the tool moved by the robot in accordance with the movement command, and a pressing direction determination section configured to determine a pressing direction in which the robot is to press the tool against the workpiece during the work, using the vector acquired by the vector acquisition section.

In another aspect of the present disclosure, a method of performing work on a workpiece by pressing a tool of a robot against the workpiece while an additional axis mechanism moves the robot and the workpiece relative to each other includes acquiring an additional axis movement amount by which the additional axis mechanism moves the robot or the workpiece, generating a movement command for causing the robot to move the tool along a work target portion on the workpiece so as to follow movement of the robot or the workpiece by the additional axis mechanism, based on the additional axis movement amount and operation plan data for causing the robot to perform an operation to move the tool along the work target portion, based on the operation plan data or the additional axis movement amount, acquiring a vector in a direction along the work target portion, which inclines in response to the additional axis movement amount with respect to a movement vector of the tool moved by the robot in accordance with the movement command, and determining a pressing direction in which the robot is to press the tool against the workpiece during the work, using the acquired vector.

According to the present disclosure, by generating the movement command based on the motion plan data and the additional axis movement amount, the tool can be moved along the work target portion along with the movement of the robot or the workpiece by the additional axis mechanism. As a result, for example, when a large workpiece is machined, the operation can be performed with the tool along with moving the workpiece, and thus, a cycle time can be reduced. At the same time, by acquiring the vector in the direction along the work target portion in the operation and determining the pressing direction using the vector, the pressing direction in which the tool is pressed against the operation target position can be appropriately set.

DETAILED DESCRIPTION OF EMBODIMENTS OF THE INVENTION

Hereinafter, embodiments of the present disclosure will be described in detail with reference to the drawings. Note that in the various embodiments to be described below, similar elements are denoted by the same reference signs, and redundant description will be omitted. First, a robot system 10 according to an embodiment will be described with reference to FIG. 1 and FIG. 2. The robot system 10 includes a robot 12, an additional axis mechanism 14, and a control device 50.

Figure 2:
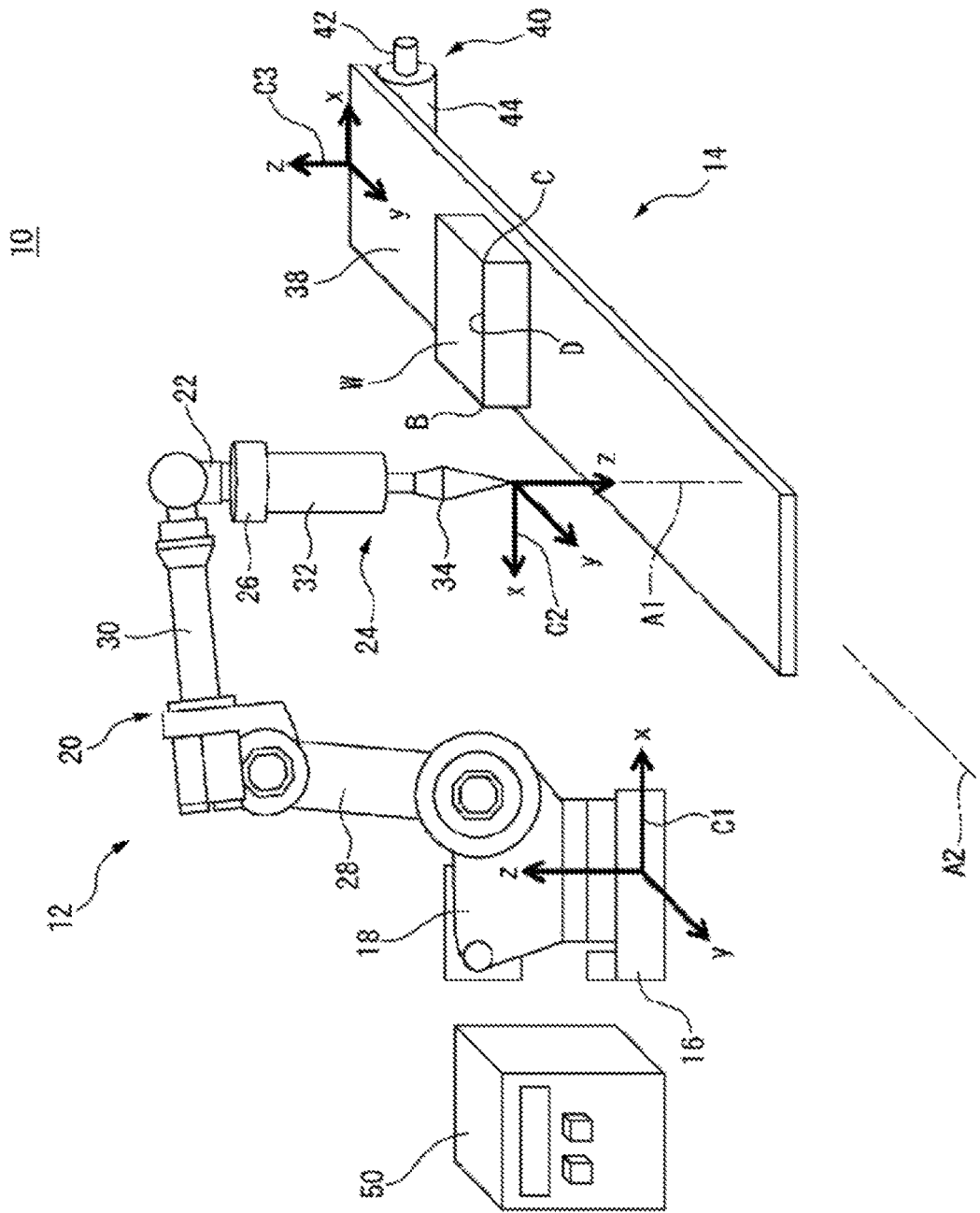
FIG. 2 is a schematic view of the robot system illustrated in FIG. 1.

In the present embodiment, as illustrated in FIG. 2, the robot 12 is a vertical articulated robot and includes a base 16, a rotating torso 18, a robot arm 20, a wrist 22, an end effector 24, and a force sensor 26. The base 16 is fixed on a floor of a work cell, and the rotating torso 18 is mounted on the base 16 to be turnable about a vertical axis. The robot arm 20 includes a lower arm 28 provided on the rotating torso 18 so as to be rotatable about a horizontal axis, and an upper arm 30 rotatably provided on a tip part of the lower arm 28. The wrist 22 is rotatably provided on a tip part of the upper arm 30 and rotatably supports the end effector 24.

Figure 1:
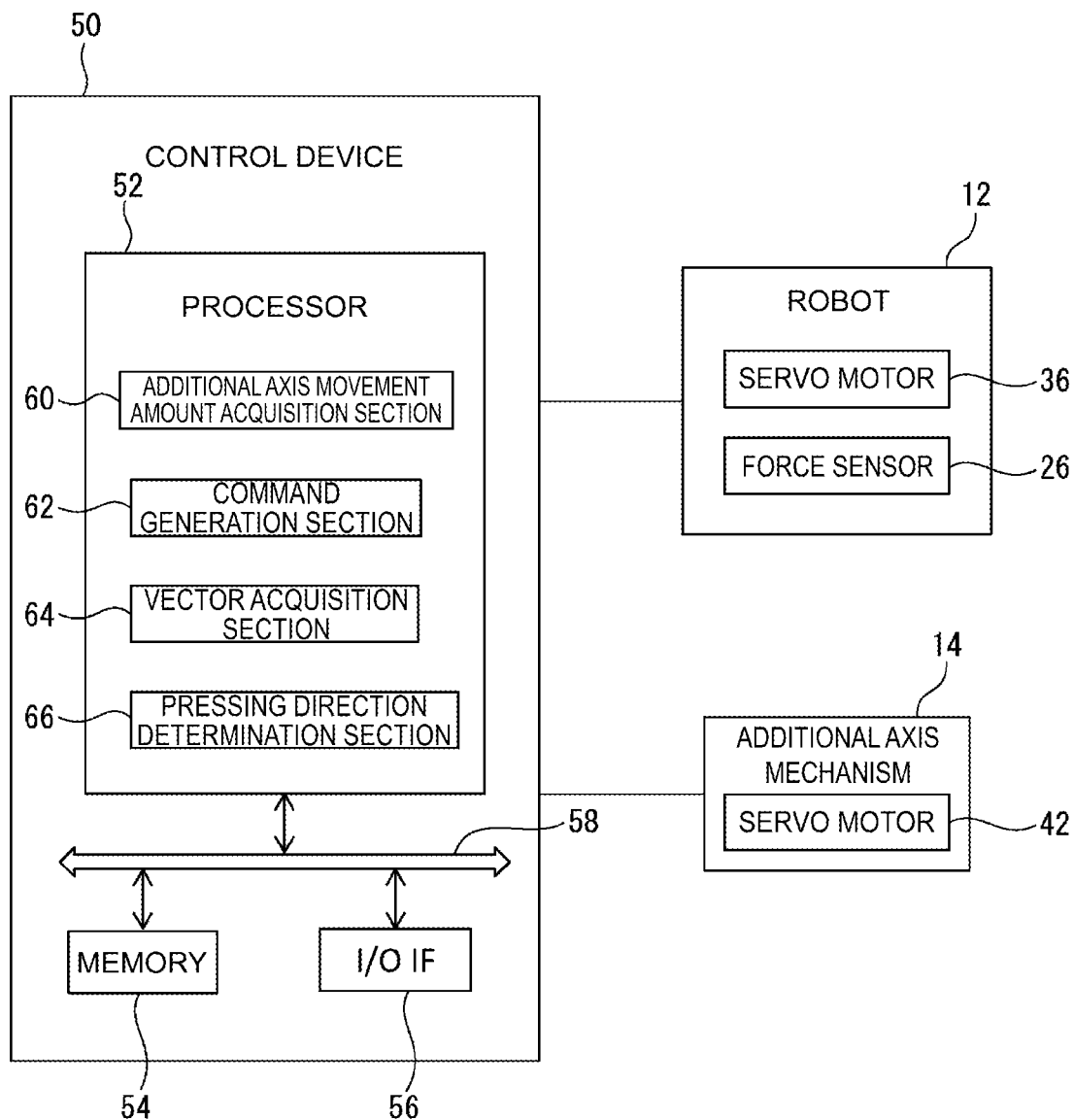
FIG. 1 is a block diagram illustrating a robot system according to an embodiment.

Each of the base 16, the rotating torso 18, the robot arm 20, and the wrist 22 includes a built-in servo motor 36 (FIG. 1). The servo motor 36 drives each movable element (i.e., the rotating torso 18, the robot arm 20, and the wrist 22) of the robot 12 in response to a command from the control device 50.

The end effector 24 includes a tool drive section 32 and a tool 34. The tool 34 is provided rotatably about an axis line A1 in the tool drive section 32. In the present embodiment, the tool 34 is a deburring tool (e.g., a polishing material), and performs a process of removing a protrusion formed on a workpiece W by a conical tip part of the tool 34 (so-called, deburring). The tool drive section 32 includes a spindle motor, an air cylinder, or the like and is coupled to a tip part of the wrist 22 with the force sensor 26 interposed therebetween. The tool drive section 32 rotates and drives the tool 34 about the axis line A1 in response to a command from the control device 50.

The force sensor 26 is inserted between the wrist 22 and the end effector 24 (specifically, the tool drive section 32). The force sensor 26 is, for example, a six-axis force sensor including a plurality of strain gauges, and detects a force F applied from the workpiece W to the tool 34 while the tool 34 is machining the workpiece W.

A robot coordinate system C1 is set in the robot 12. The robot coordinate system C1 is a control coordinate system for automatically controlling the operation of each movable element of the robot 12. In the present embodiment, the robot coordinate system C1 is fixed in a three-dimensional space, and is set with respect to the robot 12 with the origin arranged at the center of the base 16 and the z-axis coinciding with a rotating axis of the rotating torso 18.

On the other hand, a tool coordinate system C2 is set in the end effector 24 (specifically, the tool 34). The tool coordinate system C2 is a control coordinate system for automatically controlling a position of the end effector 24 (the tool 34) in the robot coordinate system C1. Note that, in the present description, "position" may refer to a position and an orientation. In the present embodiment, the tool coordinate system C2 is set with respect to the end effector 24 (the tool 34) with the origin (or TCP) arranged at a predetermined position (e.g., a tip point of the tool 34) of the end effector 24 and the z-axis coincides with the axis line A1.

The control device 50 transmits a command to each servo motor 36 of the robot 12 to dispose the end effector 24 (the tool 34) at a position represented by the tool coordinate system C2 set in the robot coordinate system C1, and positions the end effector 24 (the tool 34) at an arbitrary position in the robot coordinate system C1 by way of operation of each movable element of the robot 12.

The additional axis mechanism 14 moves the robot 12 and the workpiece W relative to each other. Specifically, the additional axis mechanism 14 is, for example, a conveyor belt, and includes a movable section 38 and a drive mechanism 40 for driving the movable section 38. The movable section 38 is, for example, a timing belt and is provided on a base frame (not illustrated) movable along an axis line A2.

The drive mechanism 40 includes a servo motor 42 (FIG. 1) and a power transmission section 44. The servo motor 42 rotates its output shaft (not illustrated) in response to a command from the control device 50. The power transmission section 44 includes, for example, a reduction gear, a pulley, a ball screw mechanism, or the like. The power transmission section 44 transmits rotational force of the output shaft of the servo motor 42 to the movable section 38, and moves the movable section 38 in a direction of the axis line A2. The workpiece W is placed on the movable section 38, using e.g. a jig (not illustrated). The additional axis mechanism 14 moves the movable section 38 to move the workpiece W and the robot 12 relative to each other along the axis line A2.

An additional axis coordinate system C3 is set in the additional axis mechanism 14. The additional axis coordinate system C3 is a control coordinate system for automatically controlling the position of the workpiece W placed on the movable section 38. In the present embodiment, the additional axis coordinate system C3 is set with respect to the additional axis mechanism 14 such that the y-axis direction is parallel to the axis line A2. The positional relationship between the additional axis coordinate system C3 and the robot coordinate system C1 is known by calibration, and coordinates of the additional axis coordinate system C3 and coordinates of the robot coordinate system C1 are mutually convertible, using a known conversion matrix.

The control device 50 controls operation of the robot 12 and the additional axis mechanism 14. Specifically, the control device 50 is a computer including a processor 52, a memory 54, and an 110 interface 56. The processor 52 includes a CPU, a GPU, or the like, and is communicably connected to the memory 54 and the I/O interface 56 via a bus 58. The processor 52 performs arithmetic processing for implementing various functions of the control device 50, which will be described below.

The memory 54 includes a RAM, a ROM, or the like, and stores various types of data temporarily or permanently. The I/O interface 56 includes, for example, an Ethernet (trade name) port, a USB port, a fiber optic connector, an HDMI (trade name) terminal, or the like, and transmits data to/from an external device through wireless or wired communication based on a command from the processor 52. The force sensor 26 and the servo motors 36 and 42 described above are communicably connected to the I/O interface 56 in a wired or wireless manner.

Next, the function of the control device 50 will be described below. The control device 50 causes the robot 12 to perform work (i.e., deburring) to press the rotating tool 34 against the workpiece W and machine the workpiece W, while the additional axis mechanism 14 moves the robot 12 and the workpiece W relative to each other. In the present embodiment, the robot 12 performs the work (deburring) along an edge D from an apex B to an apex C of the workpiece W with the tool 34. In other words, the edge D is a work target portion of the workpiece W.

The control device 50 acquires operation plan data PD as a preparatory stage before performing the work on the workpiece W. The operation plan data PD is a plan for causing the robot 12 to perform the operation to move the tool 34 along a work target portion D, and includes data of a plurality of target positions $TP_n$ where the robot 12 positions the tool 34 (or TCP), and data of a movement path $MP_n$ between two target positions $TP_n$ and $TP_{n+1}$ in the operation.

Figure 3:
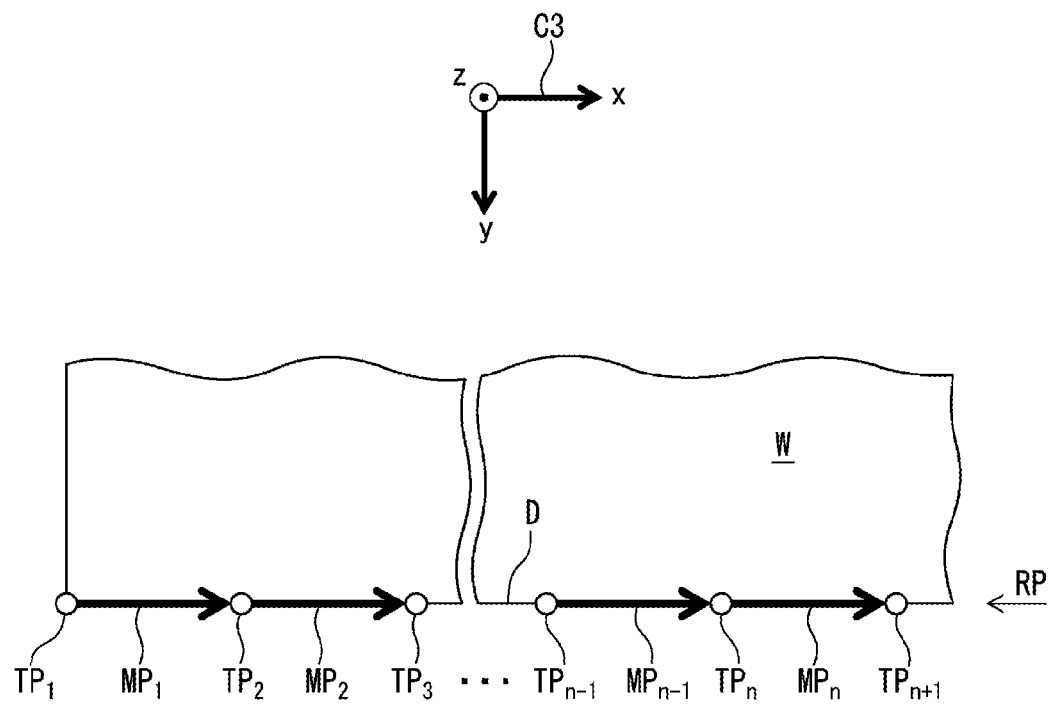
FIG. 3 is a diagram for describing operation plan data.

FIG. 3 schematically illustrates the target position $TP_n$ and the movement path $MP_n$ set for the work target portion D (n=1, 2, 3 * * * ). The operation plan data PD includes position data of the target position $TP_n$ in the robot coordinate system C1, data of the movement path $MP_n$, a velocity $V_n$ when the robot 12 moves the tool 34 along the movement path $MP_n$, and the like.

As an example, the position data of the target position $TP_n$ and the data of the movement path $MP_n$ may be obtained by teaching the operation to move the tool 34 along the work target portion D of the workpiece W to the robot 12 serving as an actual machine (so-called on-line teaching). Specifically, first, the additional axis mechanism 14 stops the workpiece W at a reference position RP with respect to the robot 12. This reference position RP may be represented as coordinates in the y-axis direction of the additional axis coordinate system C3.

Then, an operator causes the robot 12 to perform a jog operation, using e.g. a teaching device (so-called teach pendant), a tablet terminal device, or the like, and teaches, to the robot 12, an operation to move the tool 34 along the work target portion D on the workpiece W that is stopped at the reference position RP, from the apex B to the apex C. Due to this, the position data of the target position $TP_n$ and the data of the movement path $MP_n$ are acquired.

As another example, the position data of the target position $TP_n$ and the data of the movement path $MP_n$ may be acquired by simulation or the like (so-called off-line teaching). In this simulation, using a model of the robot 12, a model of the additional axis mechanism 14, and a model of the workpiece W arranged in a virtual space and performing a simulation of teaching similar to on-line teaching, the position data of the target position $TP_n$ and the data of the movement path $MP_n$ can be acquired.

Then, the operator sets a parameter such as the velocity $V_n$ in consideration of various conditions (e.g., a cycle time, a type of workpiece W) of the work. Thus, the operation plan data PD including the data of the target position $TP_n$, the movement path $MP_n$, and the velocity $V_n$ is generated. The processor 52 of the control device 50 acquires the operation plan data PD, and stores the operation plan data PD in the memory 54.

In the present embodiment, the operation plan data PD is generated based on the workpiece W stopped at a reference position P0 in the robot coordinate system C1. Thus, the operation plan data PD is data for causing the robot 12 to perform the operation to move the tool 34 along the work target portion D of the workpiece W stopped in the robot coordinate system C1.

The processor 52 starts an operation process for work (deburring) performed on the workpiece W when receiving a work start command from an operator, a host controller, or a computer program after acquiring the operation plan data PD. First, the processor 52 places the workpiece W at the reference position RP by the additional axis mechanism 14, and causes the robot 12 to place the tool 34 at the target position $TP_1$.

The processor 52 then operates the tool drive section 32 to start an operation to rotate the tool 34. Additionally, the processor 52 starts an operation to transport the workpiece W by the additional axis mechanism 14. Specifically, the processor 52 operates the drive mechanism 40 to move the movable section 38, thus starting the operation to transport the workpiece W in a y-axis positive direction of the additional axis coordinate system C3. In conjunction with this, the processor 52 starts an operation to move the tool 34 along the work target portion D by the robot 12 according to the operation plan data PD.

Specifically, based on position data of target positions $TP_1$ and $TP_2$, and data of a movement path $MP_1$ from the target position $TP_1$ to the target position $TP_2$, which are included in the operation plan data PD, the processor 52 generates a movement command $CA_1$ for moving the tool 34 (or TCP) along the movement path $MP_1$ from the target position $TP_1$ to the target position $TP_2$.

On the other hand, the processor 52 acquires, from the start time of the operation of the additional axis mechanism 14, an additional axis movement amount $\alpha_1$ of the workpiece W by which the additional axis mechanism 14 moves. The additional axis movement amount $\alpha_1$ may be, for example, a movement command $CB_1$ (e.g., a position command or a velocity command) that the processor 52 transmits to the servo motor 42 of the additional axis mechanism 14. Alternatively, the additional axis movement amount $\alpha_1$ may be a physical amount (e.g., a distance) determined from the movement command $CB_1$.

Alternatively, the additional axis movement amount $\alpha_1$ may be a physical amount obtained from feedback (e.g., a rotation angle) of a rotation detector (e.g., an encoder or a Hall element) that detects rotation of the servo motor 42, or may be a physical amount detected by a displacement sensor capable of detecting a displacement amount of the movable section 38 in the y-axis direction of the additional axis coordinate system C3. As described above, in the present embodiment, the processor 52 functions as an additional axis movement amount acquisition section 60 (FIG. 1) that acquires the additional axis movement amount $\alpha_1$ of the workpiece W to be moved by the additional axis mechanism 14.

Then, the processor 52 generates a movement command $CC_1$ for moving the tool 34 by the additional axis movement amount $\alpha_1$ in the y-axis positive direction of the additional axis coordinate system C3. Then, the processor 52 generates a movement command $CD_1$ (=the movement command $CA_1$+the movement command $CC_1$) by adding the movement command $CC_1$ generated based on the additional axis movement amount al to the movement command $CA_1$ generated based on the operation plan data PD.

Figure 4:
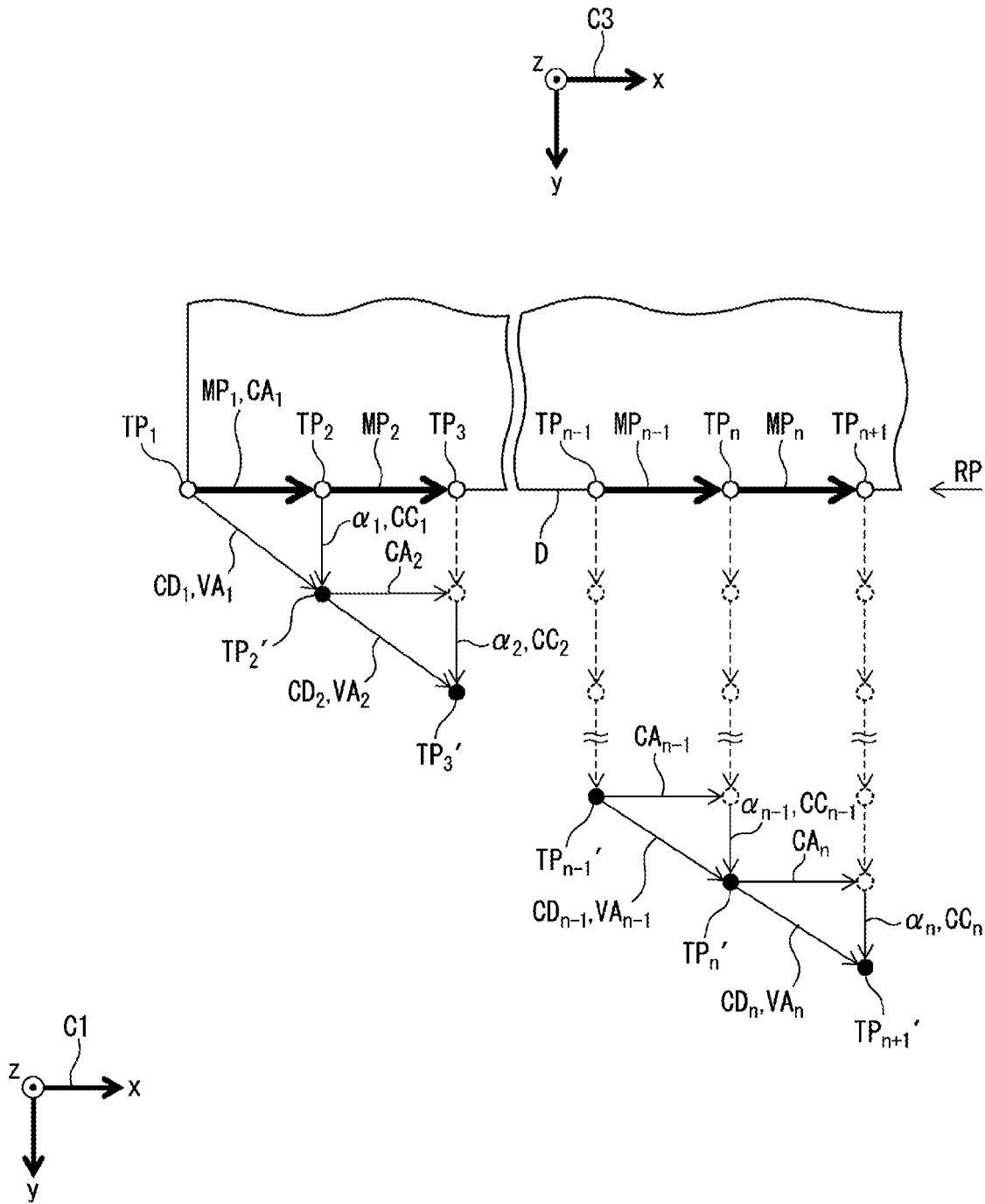
FIG. 4 is a diagram schematically illustrating the relationship among a movement path of the operation plan data, an additional axis movement amount, and a movement vector of the tool during work in the robot system illustrated in FIG. 2.

The processor 52 transmits the generated movement command $CD_1$ to each servo motor 36 of the robot 12, and causes the robot 12 to operate the tool 34 in accordance with the movement command $CD_1$. A movement vector $VA_1$ when the robot 12 moves the tool 34 in accordance with the movement command $CD_1$ is schematically illustrated in FIG. 4. The movement vector $VA_1$ corresponds to a sum of a vector in the direction along the work target portion D due to the movement command $CA_1$ and a vector in a direction of the additional axis movement amount $\alpha_1$ (i.e., the y-axis positive direction of the additional axis coordinate system C3) due to the movement command $CC_1$.

Thus, the processor 52 operates the robot 12 in accordance with the movement command $CD_1$ and moves the tool 34 along the work target portion D, following the movement of the workpiece W by the additional axis mechanism 14. As a result, the tool 34 reaches a corrected target position $TP_2'$ corrected so as to be shifted in the y-axis positive direction of the additional axis coordinate system C3 by a distance corresponding to the additional axis movement amount $\alpha_1$ from the target position $TP_2$ defined in advance in the operation plan data PD.

Thereafter, the processor 52 repeatedly performs the following processes each time a corrected target position $TPn'$ ($n \geq 2$) is reached. That is, when the tool 34 reaches the corrected target position $TPn'$, the processor 52 generates a movement command CAn for moving the tool 34 along the movement path MPn from the target position TPn to the target position TPn+1 based on the operation plan data PD.

On the other hand, the processor 52 functions as the additional axis movement amount acquisition section 60 to acquire an additional axis movement amount $\alpha_n$ by which the additional axis mechanism 14 moves the workpiece W while moving the tool 34 from a corrected target position $TP_{n-1}'$ (the target position $TP_2$ when n=2) to the corrected target position $TP_{n+1}'$. Then, the processor 52 generates a movement command $CC_n$ for moving the tool 34 in the y-axis direction of the additional axis coordinate system C3 by the additional axis movement amount $\alpha_n$. Then, the processor 52 generates a movement command $CD_n$ (=the movement command $CA_n$+the movement command $CC_n$) by adding the movement command $CC_n$ generated based on the additional axis movement amount $\alpha_n$ to the movement command $CA_n$ generated based on the operation plan data PD.

The processor 52 causes the robot 12 to move the tool 34 in accordance with the generated movement command $CD_n$. As a result, as illustrated by the movement vector $VA_n$ in FIG. 4, the tool 34 reaches a corrected target position $TP_{n+1}'$ corrected so as to be shifted in the y-axis positive direction of the additional axis coordinate system C3 by a distance corresponding to an additional axis movement amount $\Sigma=_n$ from the target position $TP_{n+1}$.

Note that the processor 52 may function as the additional axis movement amount acquisition section 60 when the tool 34 reaches the corrected target position TPn', and acquire an additional axis movement amount $\alpha n-1$ by which the additional axis mechanism 14 moves the workpiece W while moving the tool 34 from a corrected target position $TP_{n-1}'$ to a corrected target position $TP_n'$.

Then, the processor 52 may generate a movement command $CC_{n-1}$ for moving the tool 34 by the additional axis movement amount $\alpha_{n-1}$ in the y-axis direction of the additional axis coordinate system C3. Then, the processor 52 may generate the movement command $CD_n$ (=the movement command $CA_n$+the movement command $CC_{n-1}$) by adding the movement command $CC_{n-1}$ generated based on the additional axis movement amount $\alpha_{n-1}$ to the movement command $CA_n$ generated based on the operation plan data PD, and cause the robot 12 to move the tool 34 in accordance with the generated movement command $CD_n$ (=the movement command $CA_n$ and the movement command $CC_{n-1}$).

According to this, in the present embodiment, the processor 52 functions as a command generation section 62 (FIG. 1) for generating the movement command $CD_n$ for moving the tool 34 along the work target portion D following the movement of the workpiece W by the additional axis mechanism 14, as indicated by the movement vector $VA_n$, based on the operation plan data PD and the additional axis movement amount $\alpha_n$.

While moving the tool 34 in a direction of the movement vector $VA_n$ (n=1, 2, 3, * * * ) to perform the work, the processor 52 performs force control for controlling a pressing force PF at which the robot 12 presses the tool 34 against the work target portion D on the workpiece W to a predetermined target value $PF_T$. Here, in the present embodiment, the processor 52 determines a pressing direction $DR_n$ in which the robot 12 presses the tool 34 against the work target portion D on the workpiece W at a cycle at which the tool 34 reaches the corrected target position $TP_n'$.

In order to determine the pressing direction $DR_n$, the processor 52 first acquires a vector $VB_n$ in a direction along the work target portion D of the workpiece W with which the tool 34 comes into contact. As an example, when the tool 34 is made to reach the corrected target position $TP_n'$ (or before or after this time), the processor 52 acquires the vector $VB_n$ as a vector in a direction of the movement path $MP_{n-1}$ (or $MP_n$) defined in advance in the operation plan data PD.

As described above, this movement path $MP_{n-1}$ is obtained by teaching, to the robot 12, the operation to move the tool 34 along the work target portion D on the workpiece W, which is stopped relative to the robot coordinate system C1, and the direction of the movement path $MP_{n-1}$ is a direction (substantially parallel direction) along the work target portion D with which the tool 34 comes into contact when the tool 34 reaches the corrected target position $TP_n'$. In this example, the processor 52 acquires the vector $VB_n$ based on the operation plan data PD (specifically, the movement path $MP_{n-1}$).

As another example, the processor 52 may acquire the vector $VB_n$ from the movement vector $VA_{n-1}$ of the tool 34 and the additional axis movement amount $\alpha_{n-1}$ when the tool 34 reaches the corrected target position $TP_n'$. Here, the processor 52 can acquire coordinates in the robot coordinate system C1 of corrected target positions $TP_{n-1}'$ and $TP_n'$, for example, from feedback from a rotation detector (e.g., an encoder or a hall element) that detects rotation of the servo motor 36 of the robot 12 to determine the movement vector $VA_{n-1}$ from these coordinates.

Additionally, the processor 52 determines a movement vector $\alpha_{n-1}$ where the additional axis mechanism 14 moves the workpiece W by the additional axis movement amount $\alpha_{n-1}$. This movement vector $\alpha_{n-1}$ can be determined, for example, from the movement command $CB_{n-1}$ that the processor 52 transmits to the servo motor 42 when the additional axis mechanism 14 moves the workpiece W by the additional axis movement amount $\alpha_{n-1}$, or from feedback from the rotation detector of the servo motor 42.

Then, the processor 52 determines the vector $VB_n$ (=$VA_{n-1}-\alpha_{n-1}$) by subtracting the movement vector $\alpha_{n-1}$ of the additional axis movement amount $\alpha_{n-1}$ from the movement vector $VA_{n-1}$ of the tool 34. In this example, the processor 52 acquires the vector $VB_n$ based on the additional axis movement amount $\alpha_{n-1}$.

The vector $VB_n$ acquired as described above is inclined according to the additional axis movement amount $\alpha_{n-1}$ relative to the movement vector $VA_{n-1}$ of the tool 34 moved by the robot 12 in accordance with the movement command $CD_{n-1}$. According to this, in the present embodiment, the processor 52 functions as a vector acquisition section 64 (FIG. 1) that acquires the vector $VB_n$, based on the operation plan data PD or the additional axis movement amount $\alpha_{n-1}$.

The processor 52 then determines the pressing direction $DR_n$, using the acquired vector $VB_n$. Specifically, the processor 52 determines a vector that inclines at a predetermined angle $\theta$ in a direction toward the inside of the workpiece W with respect to the vector $VB_n$ by multiplying the vector $VB_n$ by a known rotation vector RV, and determines the direction of the vector as the pressing direction $DR_n$. Note that the angle θ can be set to any value by changing the parameter of the rotation vector RV.

Figure 5:
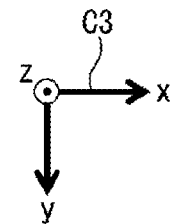
FIG. 5 is a diagram schematically illustrating the relationship between a vector in a direction along a work target portion and a pressing direction determined from the vector.
Figure 5:
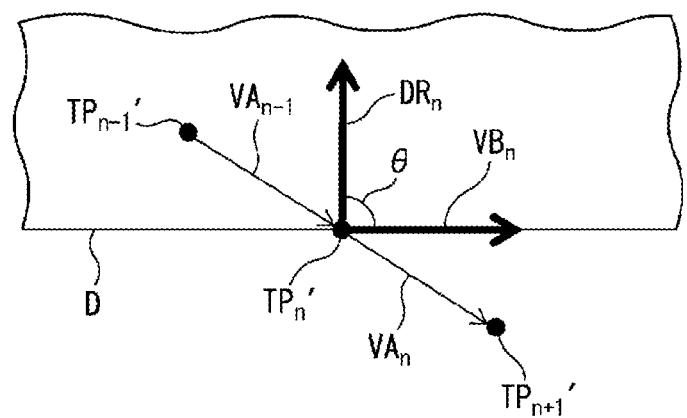
Figure 5:
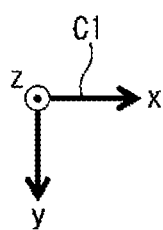

FIG. 5 schematically illustrates the vector $VB_n$ and the pressing direction $DR_n$. In the example illustrated in FIG. 5, the angle θ is set to 90° (i.e., the pressing direction $DR_n$ is orthogonal to the vector $VB_n$). Thus, in the present embodiment, the processor 52 functions as a pressing direction determination section 66 (FIG. 1) that determines the pressing direction $DR_n$ using the vector $VB_n$.

The processor 52 then causes the robot 12 to press the tool 34 against the workpiece W in the determined pressing direction $DR_n$ while moving the tool 34 from the corrected target position $TP_n'$ to the corrected target position $TP_{n+1}'$. On the other hand, during this process, the force sensor 26 continuously detects the force F applied to the tool 34 from the workpiece W.

The processor 52 functions as the command generation section 62 to generate a force control command CE for controlling the pressing force PF applied from the tool 34 to the workpiece W based on the force F acquired from the force sensor 26 to a target value $PF_T$. Then, in addition to the above-described movement command $CD_n$, the processor 52 transmits the force control command CE to each servo motor 36 of the robot 12, and controls the operation of the robot 12 in accordance with the force control command CE.

In this way, while moving the tool 34 from the corrected target position $TP_n'$ to the corrected target position $TP_{n+1}'$ according to the movement command $CD_n$, the robot 12 displaces the position of the tool 34 in the y-axis direction of the additional axis coordinate system C3, for example, according to the force control command CE. In this way, the processor 52 performs force control that causes the pressing force PF to match the target value $PF_T$ during the movement from the corrected target position $TP_n'$ to the corrected target position $TP_{n+1}'$.

It should be understood that the processor 52 can also perform the force control in a similar manner during the movement of the tool 34 from the target position $TP_1$ to the corrected target position $TP_2'$. The pressing direction $DR_1$ during the movement of the tool 34 from the target position $TP_1$ to the corrected target position $TP_2'$ may be predetermined as the direction of the movement path $MP_1$ by an operator, for example.

As described above, in the present embodiment, the processor 52 generates the movement command $CD_n$ based on the operation plan data PD and the additional axis movement amount $α_n$, and thus, the tool 34 can be moved along the work target portion D following the movement of the workpiece W by the additional axis mechanism 14. According to this configuration, for example, when a large workpiece W is machined, it is possible to achieve a reduction in cycle time because the workpiece W can be machined by the tool 34 while being moved.

In conjunction with this, the processor 52 acquires the vector $VB_n$ in the direction along the work target portion D during the work, and determines the pressing direction $DR_n$ using the vector $VB_n$. Here, in a case where the pressing direction of the tool 34 is set as a direction orthogonal to the movement vector $VA_n$ based on the movement vector $VA_n$, the pressing direction inclines without being orthogonal to the work target portion D. In this case, the tool 34 cannot be properly pressed against the workpiece W. According to the present embodiment, the pressing direction $DR_n$ is determined based on the vector $VB_n$ in the direction along the work target portion D during the work, so that the pressing direction $DR_n$ can appropriately be set so as to be orthogonal to the work target portion D (the angle θ is 90° as described above), for example.

In addition, as an example of the present embodiment, the processor 52 acquires the vector $VB_n$ described above as a vector in the direction of the movement path $MP_{n-1}$ (or $MP_n$) included in the operation plan data PD. According to this configuration, the processor 52 can easily and quickly acquire the vector $VB_n$.

On the other hand, as another example of the present embodiment, the processor 52 determines the vector $VB_n$ by subtracting the movement vector $α_{n-1}$ of the additional axis movement amount $α_{n-1}$ from the movement vector $VA_{n-1}$ of the tool 34. Here, the processor 52 periodically receives feedback from the rotation detectors of the servo motors 36 and 42 during the work and uses the feedback to control the robot 12. Then, the additional axis movement amount $α_{n-1}$ and the corrected target positions $TP_{n-1}'$ and $TP_n'$ are acquired from this feedback. According to the present embodiment, the vector $VB_n$ can be acquired using the feedback acquired as a normal operation.

Note that in the embodiment described above, a case has been described in which the additional axis mechanism 14 moves the workpiece W in the y-axis positive direction of the additional axis coordinate system C3. However, it should be understood that even when the additional axis mechanism 14 moves the workpiece W in a y-axis negative direction of the additional axis coordinate system C3, the generation of the movement command $CD_n$, the acquisition of the vector $VB_n$ and the determination of the pressing direction $DR_n$ can be performed in a similar manner, using the methods described above.

Figure 6:
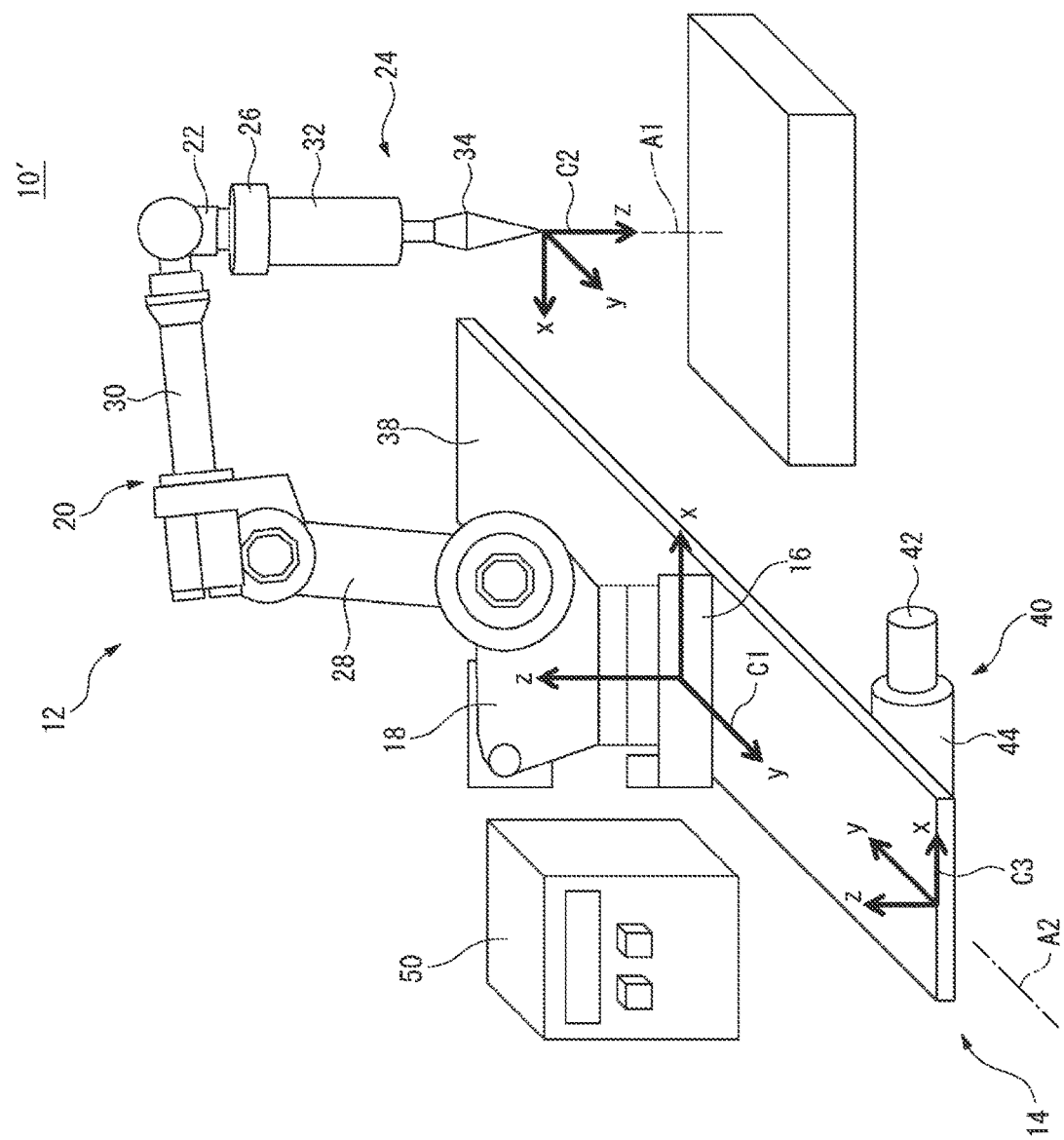
FIG. 6 is a schematic view of a robot system according to another embodiment.

In the embodiment described above, a case has been described in which the additional axis mechanism 14 moves the workpiece W relative to the robot 12. However, the additional axis mechanism 14 may move the robot 12 relative to the workpiece W. Such an embodiment is illustrated in FIG. 6. In a robot system 10' illustrated in FIG. 6, the robot 12 (specifically, the base 16) is fixed on the movable section 38 of the additional axis mechanism 14. Note that the block diagram of the robot system 10' is the same as that of the robot system 10 illustrated in FIG. 1.

In the robot system 10', the robot coordinate system C1 moves in the y-axis direction of the additional axis coordinate system C3 in response to moving the movable section 38 by the additional axis mechanism 14. The robot coordinate system C1 and the additional axis coordinate system C3 are mutually convertible, using a conversion matrix corresponding to a position in the additional axis coordinate system C3 of the origin of the robot coordinate system C1.

A function of the control device 50 of the robot system 10' will be described below. First, the control device 50 acquires the operation plan data PD as a preparatory stage. This operation plan data PD is generated by teaching, to the robot 12, the operation to move the tool 34 along the work target portion D on the workpiece W when the additional axis mechanism 14 causes the robot 12 to stop relative to the workpiece W at the reference position RP, and includes data of the target position $TP_n$, the movement path $MP_n$, and the velocity $V_n$ (n=1, 2, 3 * * *).

At the start time of the work, the processor 52 places the robot 12 at the reference position RP by the additional axis mechanism 14, and places the tool 34 at the target position $TP_1$ by the robot 12. After the start of the work, the processor 52 starts the operation to move the robot 12 (i.e., the robot coordinate system) in the y-axis positive direction of the additional axis coordinate system C3 by the additional axis mechanism 14, and generates the movement command $CA_1$ for moving the tool 34 (or TCP) from the target position $TP_1$ to the target position $TP_2$ along the movement path $MP_1$ according to the operation plan data PD.

On the other hand, the processor 52 functions as the additional axis movement amount acquisition section 60 to acquire an additional axis movement amount $\beta_1$ (FIG. 7) of the workpiece W by which the additional axis mechanism 14 moves the workpiece W from the start time of the operation of the additional axis mechanism 14. The additional axis movement amount $\beta_1$ may be a physical amount obtained from a movement command (or a physical amount determined from the movement command) to the servo motor 42, or a value detected by a rotation detector, a displacement sensor, or the like, similarly to the above-described embodiment.

Here, in the present embodiment, the processor 52 generates the movement command $CC_1$ for moving the tool 34 according to the additional axis movement amount $-\beta_1$, obtained by inverting the direction (i.e., sign) of the acquired additional axis movement amount $\beta_1$. Then, the processor 52 generates the movement command $CD_1$ (=the movement command $CA_1$+the movement command $CC_1$) by adding the movement command $CC_1$ generated based on the additional axis movement amount $-\beta_1$ to the movement command $CA_1$ generated based on the operation plan data PD. The processor 52 transmits the generated movement command $CD_1$ to each servo motor 36 of the robot 12, and causes the robot 12 to operate the tool 34 in accordance with the movement command $CD_1$.

Figure 7:
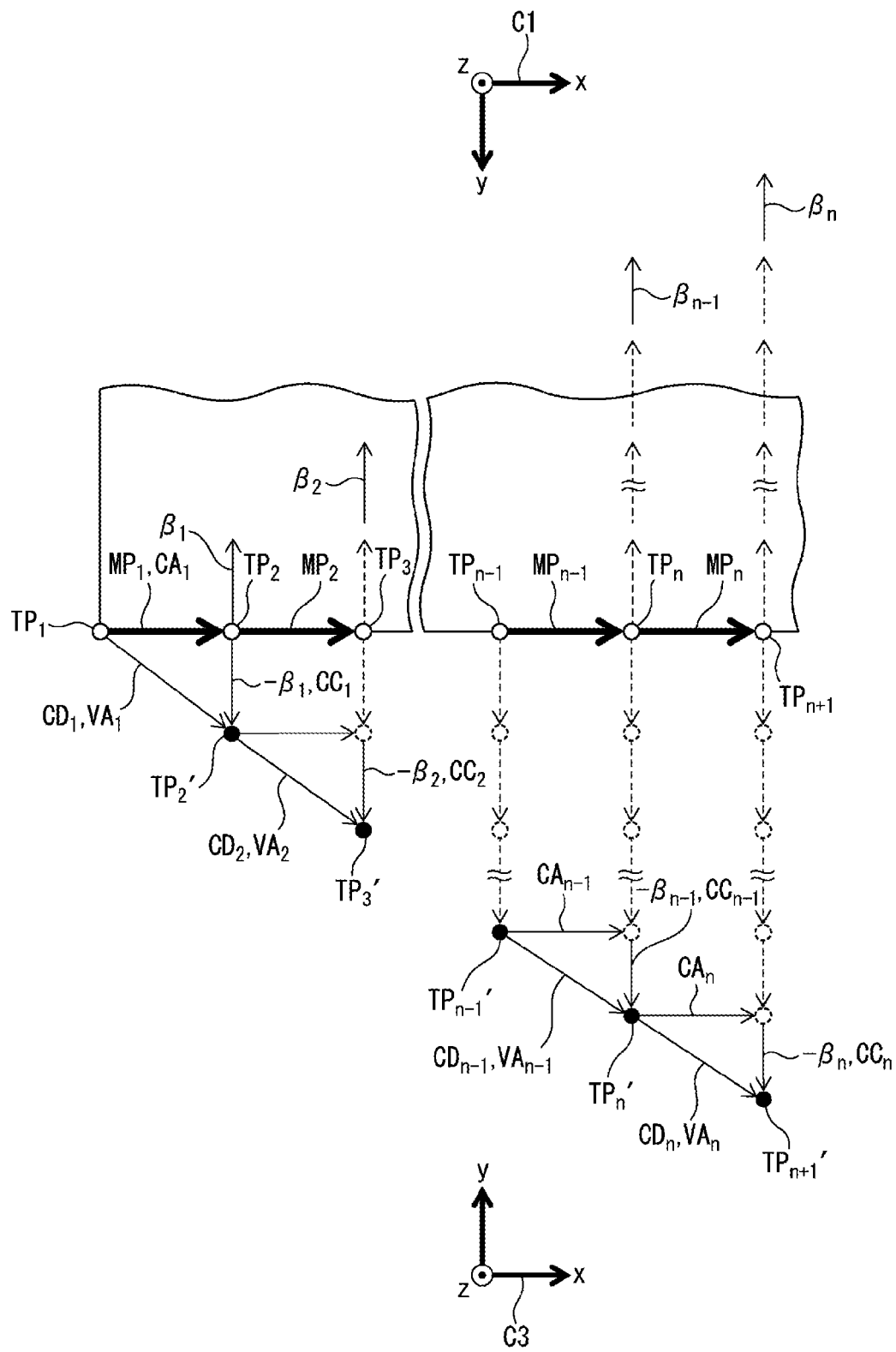
FIG. 7 is a diagram schematically illustrating the relationship among a movement path of operation plan data, an additional axis movement amount, and a movement vector of a tool during work in the robot system illustrated in FIG. 6.

The movement vector $VA_1$ of the tool 34 at this time is schematically illustrated in FIG. 7. The movement vector $VA_1$ illustrated in FIG. 7 corresponds to a sum of a vector in the direction along the work target portion D in accordance with the movement command $CA_1$ and a vector in the direction of the additional axis movement amount $-\beta_1$ (i.e., the y-axis negative direction of the additional axis coordinate system C3) in accordance with the movement command $CC_1$. In other words, the movement vector $VA_1$ is a vector obtained by subtracting the vector of the additional axis movement amount $\beta_1$ from the vector of the movement command $CA_1$.

Thus, the processor 52 operates the robot 12 in accordance with the movement command $CD_1$, and moves the tool 34 along the work target portion D following the movement of the workpiece W by the additional axis mechanism 14 to reach the corrected target position $TP_2'$. The corrected target position $TP_2'$ is shifted in the y-axis negative direction of the additional axis coordinate system C3 by a distance corresponding to the additional axis movement amount $-\beta_1$ with respect to the target position $TP_2$ in the robot coordinate system C1 at this time point (i.e., a time point when the robot coordinate system C1 is moved by the additional axis mechanism 14).

The processor 52 repeatedly performs this process at a cycle of reaching the corrected target position $T_n'$. In other words, when the corrected target position $T_n'$ is reached, the processor 52 generates the movement command $CA_n$ based on the operation plan data PD, while also functioning as the additional axis movement amount acquisition section 60 to acquire the additional axis movement amount $\beta_n$ of the workpiece W by which the additional axis mechanism 14 moves while moving the tool 34 from the corrected target position $TP_{n-1}'$ to the corrected target position $TP_n'$.

Then, the processor 52 generates the movement command $CC_n$ for moving the tool 34 by the additional axis movement amount $-\beta_n$ obtained by inverting the sign of the acquired additional axis movement amount $\beta_n$, and adds the movement command $CC_n$ to the movement command $CA_n$ to generate the movement command $CD_n$. The processor 52 causes the robot 12 to move the tool 34 in accordance with the generated movement command $CD_n$.

As a result, the tool 34 reaches the corrected target position $TP_{n+1}'$, as illustrated in the movement vector $VA_n$ in FIG. 7. The corrected target position $TP_{n+1}'$ is shifted in the y-axis negative direction of the additional axis coordinate system C3 by a distance corresponding to an additional axis movement amount $\Sigma(-\beta_n)$ with respect to the target position $TP_{n+1}$ in the robot coordinate system C1 at this time point.

On the other hand, the processor 52 determines the pressing direction $DR_n$ in which the robot 12 presses the tool 34 against the work target portion D on the workpiece W at a cycle that causes the tool 34 to reach the corrected target position $TP_n'$ in a manner similar to that of the embodiment described above. Specifically, the processor 52 functions as the vector acquisition section 64 to acquire the vector $VB_n$ in the direction along the work target portion D. As an example, the processor 52 acquires the vector $VB_n$ as a vector in the direction of the movement path $MP_{n-1}$ (or $MP_n$).

As another example, the processor 52 determines the vector $VB_n$ (=$VA_{n-1}+\beta_{n-1}$) by adding the movement vector $\beta_{n-1}$ of the additional axis movement amount $\beta_{n-1}$ to the movement vector $VA_{n-1}$ of the tool 34 (in other words, by subtracting the movement vector of the additional axis movement amount $-\beta_{n-1}$ from the movement vector $VA_{n-1}$). This vector $VB_n$ inclines according to the additional axis movement amount $\beta_{n-1}$ with respect to the movement vector $VA_{n-1}$ of the tool 34 moved by the robot 12 in accordance with the movement command $CD_{n-1}$.

Then, similarly to the above-described embodiment, the processor 52 functions as the pressing direction determination section 66 to determine the pressing direction $DR_n$, using the acquired vector $VB_n$. The processor 52 performs force control of controlling the pressing force PF to the target value $PF_T$ with the tool 34 pressed against the workpiece W by the robot 12 in the determined pressing direction $DR_n$ while moving the tool 34 from the corrected target position $TP_n'$ to the corrected target position $TP_{n+1}'$.

According to the present embodiment, in a similar manner to that in the above-described embodiment, the movement command $CD_n$ is generated based on the operation plan data PD and the additional axis movement amount $\alpha_n$, and the tool 34 can be moved along the work target portion D following the movement of the robot 12 by the additional axis mechanism 14. Thus, the pressing direction $DR_n$ can be appropriately set with respect to the work target portion D by determining the pressing direction $DR_n$ using the vector $VB_n$ while achieving a reduction in cycle time.

Figure 8:
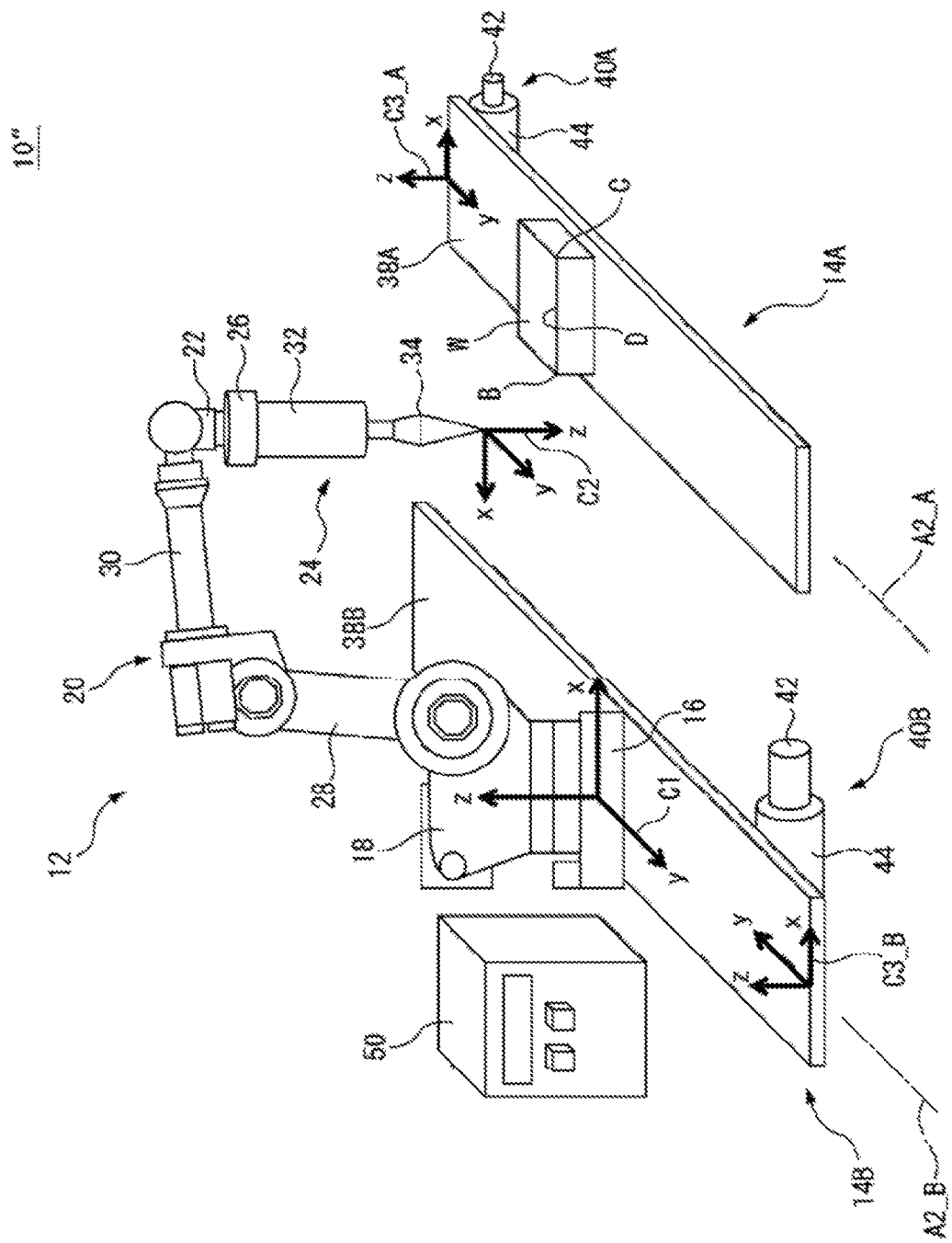
FIG. 8 is a schematic view of a robot system according to still another embodiment.
Figure 9:
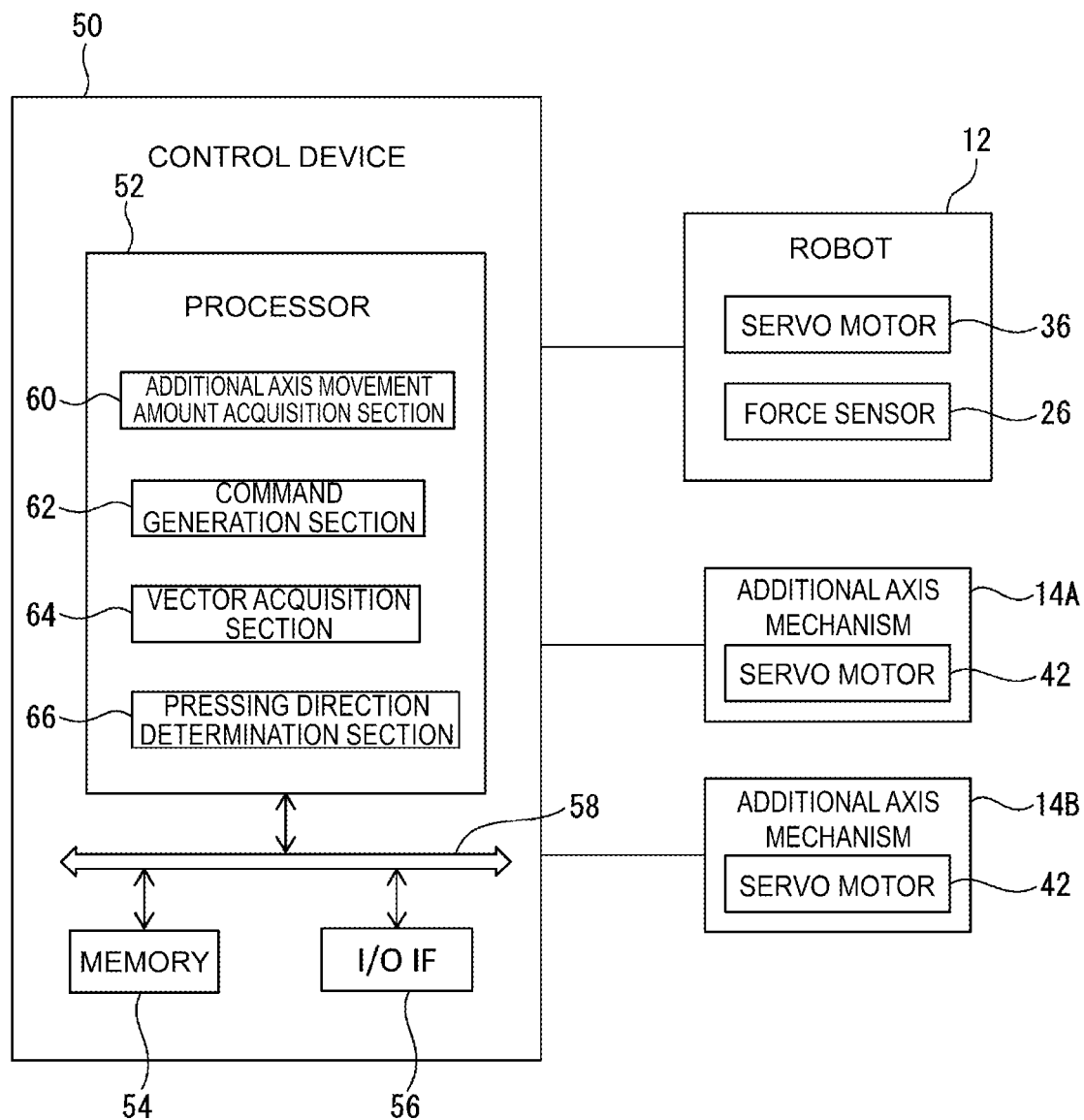
FIG. 9 is a block diagram illustrating the robot system illustrated in FIG. 8.

Note that the robot 12 and the workpiece W may be independently moved by a plurality of additional axis mechanisms. Such an embodiment is illustrated in FIG. 8 and FIG. 9. A robot system 10" illustrated in FIG. 8 and FIG. 9 includes the robot 12, additional axis mechanisms 14A and 14B, and the control device 50. The additional axis mechanisms 14A and 14B have the same configuration as that of the additional axis mechanism 14 illustrated in FIG. 2 and FIG. 6, respectively.

The control device 50 (specifically, the processor 52) of the robot system 10" drives a drive mechanism 40A based on an additional axis coordinate system C3_A of the additional axis mechanism 14A, and transports a workpiece placed on a movable section 38A along an axis line A2_A. Further, the control device 50 drives a drive mechanism 40B based on an additional axis coordinate system C3_B of the additional axis mechanism 14B, and transports the robot 12 placed on a movable section 38B along an axis line A2_B.

In the present embodiment, during work, the processor 52 moves the workpiece W by the additional axis mechanism 14A and moves the robot 12 by the additional axis mechanism 14B. Also in this case, by combining the methods described in the embodiment illustrated in FIG. 2 and the embodiment illustrated in FIG. 6, the processor 52 can generate the movement command $CD_n$, acquire the vector $VB_n$, and determine the pressing direction $DR_n$.

Specifically, the processor 52 functions as the additional axis movement amount acquisition section 60 to calculate a combined additional axis movement amount $\gamma_n \alpha_n - \beta_1$ by adding the additional axis movement amount $-\beta_1$ obtained by inverting the sign of the additional axis movement amount $\beta_n$ by which the additional axis mechanism 14B moves the robot 12 in the y-axis direction of the additional axis coordinate system C3_B, to the additional axis movement amount $\alpha_n$ by which the additional axis mechanism 14A moves the workpiece W in the y-axis direction of the additional axis coordinate system C3_A (in other words, by subtracting the additional axis movement amount $\beta_n$ from the additional axis movement amount $\alpha_n$). The processor 52 can generate the movement command $CD_n$, obtain the vector $VB_n$, and determine the pressing direction $DR_n$, based on the combined additional axis movement amount $\gamma_n$.

Note that in the embodiments described above, a case has been described in which the target position $TP_n$ included in the operation plan data PD is obtained in advance by teaching the robot 12. However, at least one of a plurality of target positions $TP_n$ may be an interpolation target position calculated from a target position obtained in advance by teaching the robot 12.

For example, the target position $TP_n$ and a target position $TP_{n+3}$ are obtained in advance by teaching the robot 12, while the target position $TP_{n+1}$ and a target position $TP_{n+2}$ located therebetween may be the interpolation target position automatically calculated from the target position $TP_n$ and the target position $TP_{n+3}$. Position data of the interpolation target position determined from the target positions taught in this manner is also included in the operation plan data PD.

Additionally, in the above-described embodiments, the tool 34 is a deburring tool and a case where the robot 12 performs a deburring operation on the workpiece W has been described. However, the tool 34 is not limited thereto and may be any type of tool (e.g., a cutting tool) that is pressed against the workpiece W and that is for performing a predetermined operation.

Additionally, the additional axis mechanism 14 is not limited to a belt conveyor and may be, for example, any type of mechanism capable of moving the workpiece W and the robot 12 relative to each other, such as a movable work table, a workpiece convey device including a ball screw mechanism configured to drive the work table in a predetermined direction, and a traveling device including a rail and a truck traveling on the rail.

In addition, in the embodiments described above, a case has been described in which the control device 50 is one computer and controls the robot 12 and the additional axis mechanism 14. However, the robot system 10, 10', or 10" may include a first control device 50A that controls the robot 12 and a second control device 50B that controls the additional axis mechanism 14. In this case, the rotation detector of the servo motor 42 may be connected to the first control device 50A and supply feedback (e.g., a rotation angle) to the first control device 50A.

In this case, the control devices 50A and 50B are communicably connected to each other and perform the various functions described above while communicating with each other. In this case, any one of the control devices 50A and 508 may function as the additional axis movement amount acquisition section 60, the command generation section 62, the vector acquisition section 64, and the pressing direction determination section 66.

Alternatively, the first control device 50A may perform at least one function of the additional axis movement amount acquisition section 60, the command generation section 62, the vector acquisition section 64, and the pressing direction determination section 66, while the second control device 50B may perform another function different from that of the first control device 50A among the additional axis movement amount acquisition section 60, the command generation section 62, the vector acquisition section 64, and the pressing direction determination section 66. Although the present disclosure has been described above through the embodiments, the invention according to the claims is not limited to the above-described embodiments.

Figure 10:
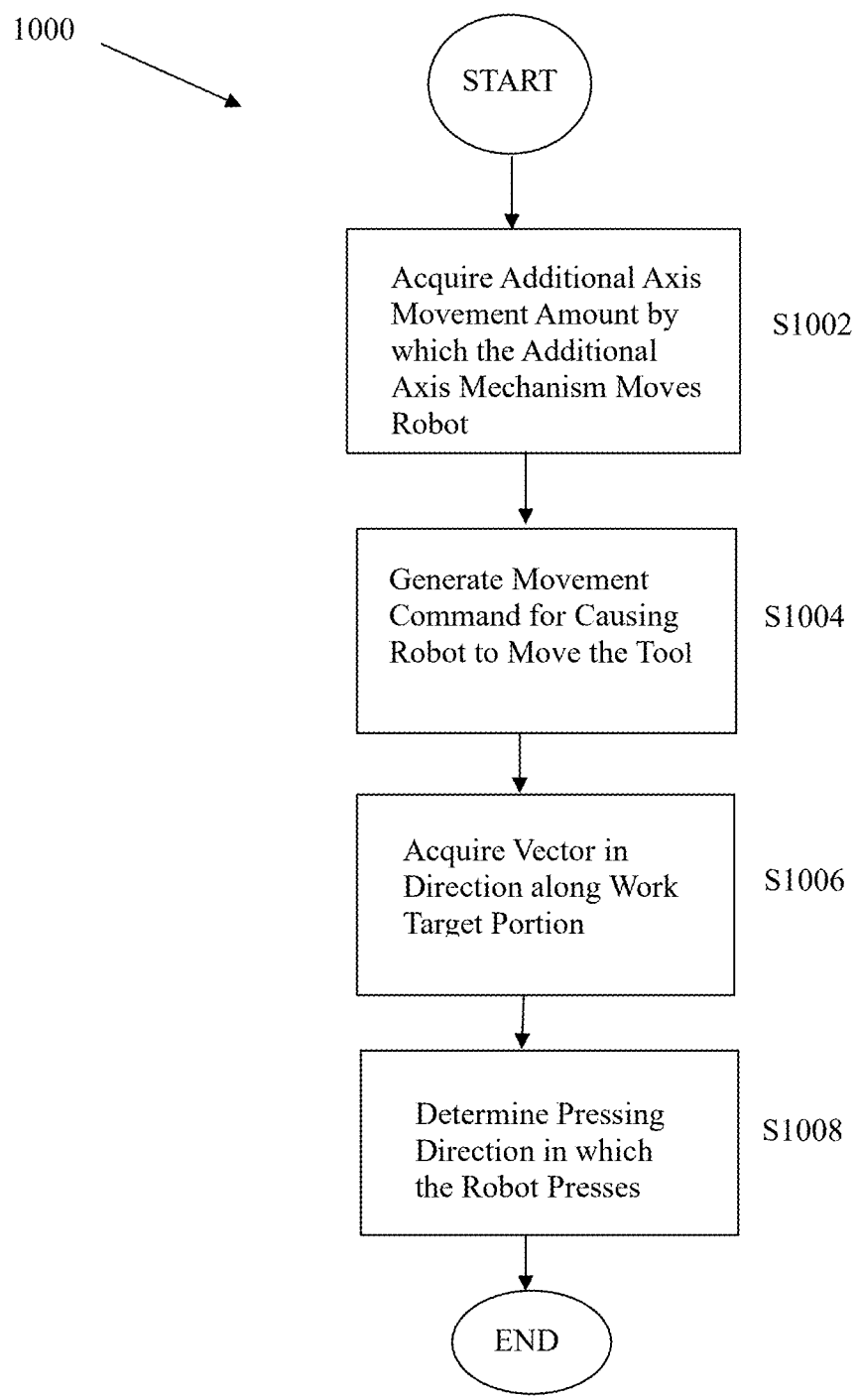
FIG. 10 is a flowchart showing a process of performing work on a workpiece by pressing a tool of a robot against the workpiece while an additional axis mechanism moves the robot and the workpiece relative to each other.

FIG. 10 is a flowchart showing a process of performing work on a workpiece by pressing a tool of a robot against the workpiece while an additional axis mechanism move the robot and the workpiece relative to each other.

The process 1000 starts and moves to step S1002. At step S1002, the processor 52 acquires an additional axis amount $\alpha_n$ by which the additional axis mechanism 14 moves the robot 12. The process 1000 moves to step S1004.

At step S1004, the processor 52 generates a movement command $CD_n$ for causing the robot 12 to move the tool 34. The process 1000 moves to step S1006.

At step S1006, the processor 52 acquires a vector $VA_n$ in a direction along the work target portion D. The process 1000 moves to step S1008.

At step S1008, the processor 52 determines a pressing direction $DR_n$ in which the robot 12 presses, and the process 1000 ends.

REFERENCE SIGNS LIST 10, 10', 10" Robot system
12 Robot
14 Additional axis mechanism
26 Force sensor
50, 50A, 50B Control device
52 Processor
60 Additional axis movement amount acquisition section
62 Command generation section
64 Vector acquisition section
66 Pressing direction determination section

The invention claimed is:

1. A control device configured to perform work on a workpiece by pressing a tool of a robot against the workpiece while an additional axis mechanism moves the robot and the workpiece relative to each other, the control device comprising a processor configured to:

acquire and transmit to the additional axis mechanism an additional axis movement command for causing the additional axis mechanism to move the robot or the workpiece;

generate a movement command for causing the robot to move the tool along a work target portion on the workpiece so as to follow movement of the robot or the workpiece by the additional axis mechanism, based on the additional axis movement command and operation plan data for causing the robot to perform an operation to move the tool along the work target portion;

based on the operation plan data or the additional axis movement command, acquire a vector in a direction along the work target portion, which inclines in response to the additional axis movement command with respect to a movement vector of the tool moved by the robot in accordance with the movement command;

determine a pressing direction in which the robot is to press the tool against the workpiece during the work based on the acquired vector;

when the tool is moved to one corrected target position in accordance with the generated movement command, acquire a first additional axis movement command for causing the additional axis mechanism to move the robot or the workpiece during moving the tool to a next corrected target position; and generate the movement command for moving the tool to the next corrected target position by adding a movement command generated based on the first additional axis movement command to a movement command generated based on the operation plan data.

2. The control device of claim 1, wherein the operation plan data includes a plurality of target positions at which the robot is to position the tool during the operation, and a movement path between two of the target positions, wherein the processor acquires, as the vector, a vector in a direction of the movement path.

3. The control device of claim 2, wherein position data of the plurality of target positions, and data of the movement path are acquired by teaching the operation to the robot while the additional axis mechanism stops the robot or the workpiece.

4. The control device of claim 1, wherein the processor acquires the vector by subtracting a movement vector, along which the additional axis mechanism moves the robot or the workpiece by the additional axis movement command, from the movement vector of the tool.

5. The control device of claim 1, wherein the processor determines a direction orthogonal to the vector as the pressing direction.

6. The control device of claim 1, wherein the processor further generates a force control command for controlling a pressing force, by which the robot presses the tool against the workpiece in the pressing direction determined by the processor, to a predetermined target value.

7. A robot system comprising:
a robot including a tool;
an additional axis mechanism configured to move the robot and the workpiece relative to each other; and
the control device of claim 1.

8. A method of performing work on a workpiece by pressing a tool of a robot against the workpiece while an additional axis mechanism moves the robot and the workpiece relative to each other, the method comprising:

acquiring and transmitting to the additional axis mechanism an additional axis movement command for causing the additional axis mechanism to move the robot or the workpiece;

generating a movement command for causing the robot to move the tool along a work target portion on the workpiece so as to follow movement of the robot or the workpiece by the additional axis mechanism, based on the additional axis movement command and operation plan data for causing the robot to perform an operation to move the tool along the work target portion;

based on the operation plan data or the additional axis movement command, acquiring a vector in a direction along the work target portion, which inclines in response to the additional axis movement command with respect to a movement vector of the tool moved by the robot in accordance with the movement command;

determining a pressing direction in which the robot is to press the tool against the workpiece during the work based on the acquired vector;

when the tool is moved to one corrected target position in accordance with the generated movement command, acquiring a first additional axis movement command for causing the additional axis mechanism to move the robot or the workpiece during moving the tool to a next corrected target position; and generating the movement command for moving the tool to the next corrected target position by adding a movement command generated based on the first additional axis movement command to a movement command generated based on the operation plan data.

* * * * *